United States Patent [19]
Schmidt

[11] Patent Number: 5,571,058
[45] Date of Patent: Nov. 5, 1996

[54] FOUR-MODE, INPUT-SPLIT, PARALELL, HYBRID TRANSMISSION

[75] Inventor: Michael R. Schmidt, Carmel, Ind.

[73] Assignee: General Motors Corporation, Detroit, Mich.

[21] Appl. No.: 512,497

[22] Filed: Aug. 8, 1995

[51] Int. Cl.$^6$ .................................................. B60K 17/04
[52] U.S. Cl. ..................................... 475/5; 477/3; 475/28
[58] Field of Search .......................... 475/5, 6, 28; 477/1, 477/3

[56] References Cited

U.S. PATENT DOCUMENTS

| | | | |
|---|---|---|---|
| 4,354,144 | 10/1982 | McCarthy | 477/3 |
| 5,120,282 | 6/1992 | Fjallstrom | 475/5 |
| 5,168,946 | 12/1992 | Dorgan | 475/5 |
| 5,509,491 | 4/1996 | Hall, III | 475/5 |

Primary Examiner—Dirk Wright
Attorney, Agent, or Firm—Donald F. Scherer

[57] ABSTRACT

A variable, four-mode, input-split, parallel, hybrid electric transmission for a vehicle. An input shaft receives power from the vehicle engine, and an intermediate output shaft delivers power to drive the vehicle. First and second motor/generators are employed as are energy storage devices, such as batteries, for accepting power from, and supplying power to, the first and second motor/generators. A control unit regulates power flow between the energy storage devices and the motor/generators as well as between the first and second motor/generators. A compounded planetary gear set and an intermediate planetary gear set are used. Each planetary gear sub-set and the intermediate planetary gear set has an inner gear member and an outer gear member, each of which meshingly engage a plurality of planet gear members supported on a carrier. The input shaft is operatively connected to one of the gear members in the compounded planetary gear set, and the intermediate output shaft is operatively connected to two of the other gear members in the compounded planetary gear set as well as at least one gear member in the intermediate planetary gear set. One of the motor/generators is connected to at least one remaining gear member in the second planetary gear sub-set, and the other motor/generator is selectively connected to the intermediate power output shaft as well as to a common gear member in both planetary gear 12 sub-sets.

12 Claims, 1 Drawing Sheet

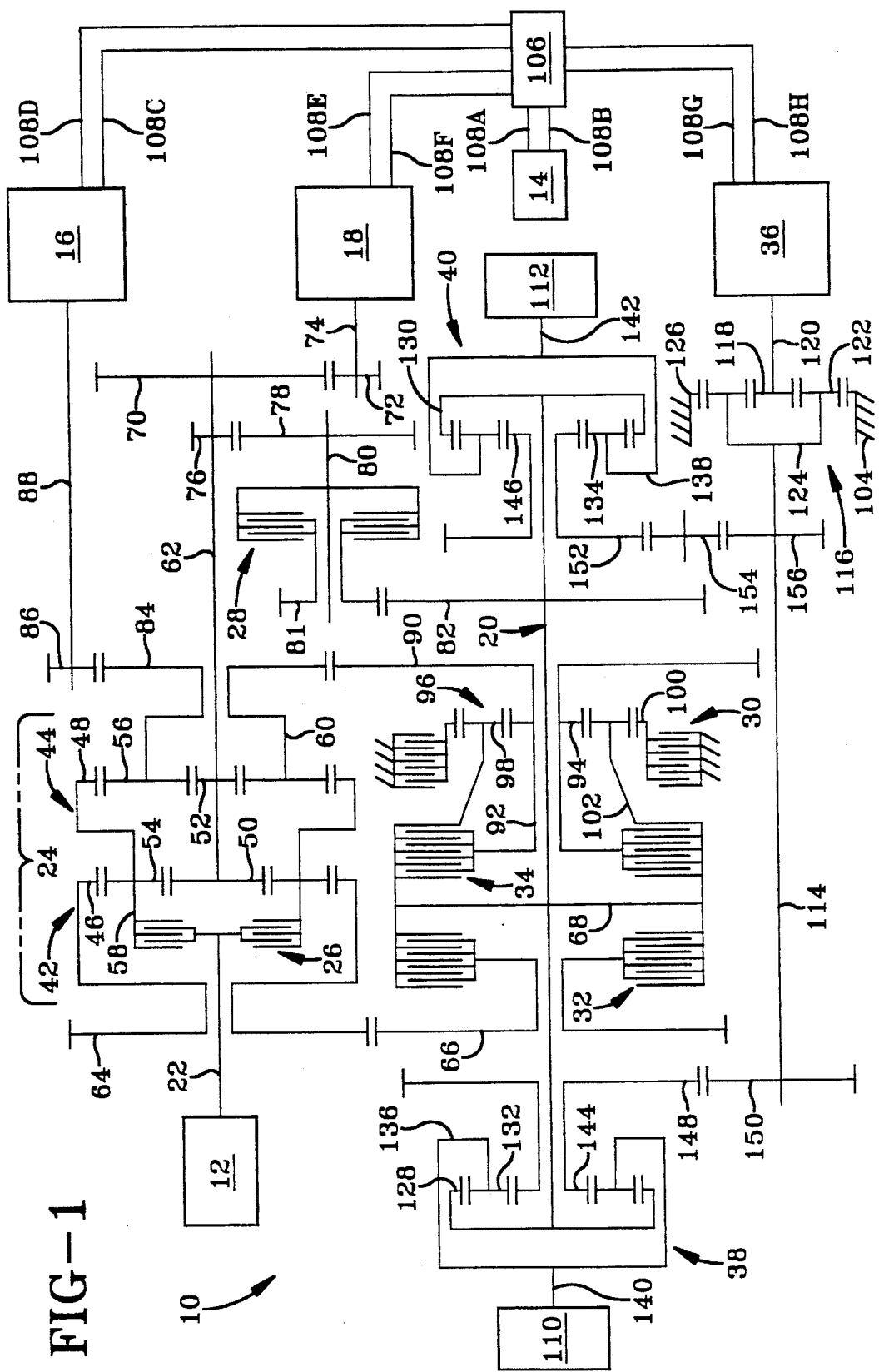

FOUR-MODE, INPUT-SPLIT, PARALELL, HYBRID TRANSMISSION

The invention herein described was made with government support under Agreement No. MDA972-94-2-0004 awarded by the Advanced Research Prospects Agency (ARPA). The Government may have certain rights to this invention.

TECHNICAL FIELD

The present invention relates generally to vehicular transmissions. More particularly, the present invention relates to transmissions adapted for track-driven vehicles, the transmission being capable of receiving input power from either an engine, a source of stored electrical energy, or both. Specifically, the present invention relates to a four-mode, input-split, parallel, hybrid vehicular transmission that will readily interact with a steer unit adapted for tracked vehicles.

BACKGROUND OF THE INVENTION

Public concern about air quality and the federal air laws have created a large demand for low emission vehicles. One form of a low emission vehicle is an electric vehicle. The first electric powered vehicles employed transmissions that received power from a source of stored electrical energy, such as a battery. Energy from the battery powered an electric motor which, in turn, drove the wheels of the vehicle through a transmission. When the charge on the battery was expended, there was no more energy available, and the vehicle could not move on its own until the battery was recharged. In order to extend the range of such vehicles, an engine and a generator were incorporated to convert a fossil fuel into electrical energy. Typically, the engine would drive the generator, and the resulting electrical energy was directed either to the battery, so that it might be recharged, or to one or more electrical motors that could assist in driving the vehicle wheels. This type system is designated as a series, hybrid propulsion system.

In short, a series, hybrid propulsion system is one in which energy follows a path from an engine to an electrical storage device and then to an electrical motor which applies power to rotate the wheels or move the track. There is no mechanical path between the engine and the wheels, or track, in a series, hybrid propulsion system.

Series, hybrid propulsion systems for vehicles are generally provided with a low-power engine for minimum emissions and high fuel economy. Such systems are inefficient when the vehicle requires high-average output power or operates at continuous, constant speeds. Moreover, high efficiency is not available when the vehicle is required to climb steep grades or when the vehicle must sustain high-average cruising speeds. It is also recognized that the series, hybrid transmission requires sizable motor/generators and must be available in a wide variety of motor/generator sizes so that the motor/generator may be individually selected to provide the requisite power for specific vehicle weights and anticipated loads.

The challenge is to provide a power system that will operate at high efficiencies over a wide variety of operating conditions. Desirable electric variable transmissions (commonly designated as EVT's) should leverage the benefits of a series, hybrid transmission for desirable low-average power duty cycles—i.e.: low speed start/stop duty cycles— as well as the benefits of a parallel, hybrid transmission for high-average output power, high speed duty cycles.

SUMMARY OF THE INVENTION

It is, therefore, a primary object of the present invention to furnish a hybrid transmission that provides the desired high efficiency sought for continuous constant speed operation and high-average power applications.

It is another object of the present invention to furnish a hybrid transmission, as above, that provides the desired high efficiency sought for continuous, constant speed operation and high-average power applications.

It is also an object of the present invention to furnish a hybrid transmission, as above, that provides improved performance in the start/stop portions of a vehicles's duty cycle.

It is a further primary object of the present invention to furnish a hybrid transmission, as above, that provides not only higher efficiency in constant speed (low power) operation but also, by virtue of the parallel configuration, requires less cooling.

It is yet another object of the present invention to provide a hybrid transmission, as above, which maximizes power density such that the transmission can be installed in existing military, or commercial, vehicles that have standard drop center axles so that the suspension, or the brake, systems need not be re-engineered.

It is a still further object of the present invention to provide a hybrid transmission, as above, that allows operation under purely electrical power to achieve improved operation in urban areas or, alternatively, to achieve improved operation under conditions that require maximum stealth.

It is still another object of the present invention to provide a hybrid transmission, as above, in which all range shifts are synchronized shifts inasmuch as each electrical unit, the engine and the output speeds remain unchanged during the shift.

It is a yet another object of the present invention to furnish a hybrid transmission, as above, that may utilize a smaller motor for a given maximum output torque requirement.

It is an even further object of the present invention to provide a hybrid transmission, as above, that achieves continuously variable drive ratios.

It is also an object of the present invention to provide a hybrid transmission, as above, that provides high tractive effort at medium vehicle speeds.

These and other objects of the invention, as well as the advantages thereof over existing and prior art forms, which will be apparent in view of the following detailed specification, are accomplished by means hereinafter described and claimed.

In general, a variable, four-mode, input-split, parallel, hybrid electric transmission embodying the concepts of the present invention utilizes an input means to receive power from the vehicle engine and a power output means to deliver power to drive the vehicle. First and second motor/generators are connected to energy storage devices, such as batteries, so that the energy storage devices can accept power from, and supply power to, the first and second motor/generators. An electric control unit regulates power flow between the energy storage units and the motor/generators, between the energy storage units and a steer unit, as well as between the first and second motor/generators.

The transmission also employs a plurality of planetary gear sets, at least two of which are compounded. The compounded planetary gear set thus includes a first and a second planetary gear sub-set. The first and second planetary gear sub-sets each has an inner gear member and an outer gear member, each of which meshingly engages a plurality of planet gear members. Each of the first and second planetary gear sub-sets also includes a carrier that rotatably supports the planet gear members. The input shaft is operatively connected to one of the gear members in the first planetary gear sub-set.

The first motor/generator is operatively connected to one of the gear members in the second planetary gear sub-set, and the second motor/generator is operatively connected to another gear member in both the first and second planetary gear sub-sets, as by a common shaft.

There are at least four different modes, or gear trains, by which to deliver power from the input shaft, and/or the motor/generators, to a common output shaft. When the vehicle incorporating the subject hybrid transmission is a tracked vehicle, the common output shaft will be an intermediate output shaft, and the description herein shall utilize the intermediate shaft designation. In either event, each mode delivers power to the intermediate output shaft using a different gear train—i.e.: a different configuration of gears within the transmission. The different gear trains are achieved by selectively engaging and disengaging a plurality of torque transfer devices.

The first of the torque transfer devices used to effect mode selection is operatively disposed to effect a selective connection between the means which joins those gear members in the first and second planetary gear sub-sets to the intermediate output shaft.

The second of the torque transfer devices used to effect mode selection is operatively disposed selective to ground one gear member of an intermediate planetary gear set that is operatively located between the compound planetary gear set and the intermediate output shaft.

The third of the torque transfer devices used to effect mode selection is operatively disposed to effect a selective connection between another gear member of the first planetary gear sub-set and the intermediate output shaft.

The fourth torque transfer device used to effect mode selection is operatively disposed to effect a selective connection between one of the gear members in the intermediate planetary gear set that is not grounded and the intermediate output shaft.

The ECU selectively engages and disengages each of the aforesaid four torque transfer devices to effect the desired mode of operation.

A steer unit and steering components may be incorporated into the hybrid transmission to enable a tracked vehicle to turn or pivot. The present invention is disclosed in combination with a steer unit for a tracked vehicle. However, the steer unit and associated components may be eliminated to provide a four-mode electric EVT for any wheeled vehicle that requires a high tractive effort.

When a steer unit for track vehicles is employed, an electric control unit (ECU) directs the steer unit to provide torque to a steer control shaft, as through a connecting means in the nature of a simple, steer-selecting planetary gear set in which the outer gear member is permanently grounded. The steer control shaft is operatively connected to a pair of output planetary gear sets such that equal, but opposite, rotation is delivered to the inner gear members of each output planetary gear set. Individual right and left output shafts that drive the corresponding tracks are connected to the carrier of the respective output planetary gear set. The outer gear member of each output planetary gear set is operatively connected to the common output shaft.

To acquaint persons skilled in the arts most closely related to the present invention, an exemplary embodiment of a variable, four-mode, input-split, parallel, hybrid electric transmission that illustrates the best mode now contemplated for putting the invention into practice is described herein by, and with reference to, the annexed drawing that forms a part of the specification. The exemplary embodiment of the hybrid transmission is described in detail without attempting to show all of the various forms and modifications in which the invention might be embodied. As such, the embodiment shown and described herein is illustrative, and as will become apparent to those skilled in these arts, can be modified in numerous ways within the spirit and scope of the invention; the invention being measured by the appended claims and not by the details of the specification.

BRIEF DESCRIPTION OF THE DRAWINGS

FIG. 1 is a schematic representation of a four-mode, input-split, hybrid transmission embodying the concepts of the present invention.

DESCRIPTION OF AN EXEMPLARY EMBODIMENT

One representative form of a variable, four-mode, input-split, hybrid electric transmission embodying the concepts of the present invention is designated generally by the numeral 10 on the accompanying drawing. The hybrid transmission 10 provides the structure to distribute power from an engine 12 and/or an electric storage device 14—through two motor/generators 16 and 18—to a common, intermediate output shaft 20. The hybrid transmission 10 has a power input means, such as a shaft, 22 that is selectively connected to a compound planetary gear set 24, as through an engine disconnect torque transfer device 26.

First, second, third and fourth torque transfer devices 28, 30, 32, and 34, respectively, serve to provide operable connections from the input shaft 22—as well as the two motor/generators 16 and 18—to the intermediate output shaft 20. Each motor/generator 16 and 18 is capable of converting electrical energy to mechanical power and is capable of converting mechanical power to electrical energy. Conversely, the electric storage device 14 is capable of providing electrical energy to the motor/generators 16 and 18 and is capable of accepting electrical energy from the motor/generators 16 and 18 for storage. When the present invention is installed in a tracked vehicle, a steer unit 36 may be operatively connected to a pair of output planetary gear sets 38 and 40 to provide steering.

In the preferred embodiment of the present invention, the engine 12 delivers torque to the compound planetary gear set 24 through the power input shaft 22. The compound planetary gear set 24 comprises first and second planetary gear sub-sets 42 and 44, each having an outer gear member 46 and 48 and an inner gear member 50 and 52, respectively. Each planetary gear sub-set 42 and 44 further includes a respective plurality of planet gears 54 and 56 that are rotatably mounted on corresponding carriers 58 and 60. The planet gears 54 and 56 in each respective planetary gear sub-set 42 and 44 meshingly engage the outer gear members 46 or 48 and the inner gear members 50 or 52 in the appropriate planetary gear sub-set 42 or 44.

The inner gear members 50 and 52 are directly connected by a first delivery shaft 62. The carrier 58 in the first planetary gear sub-set 42 is directly connected to the outer gear member 48 of the second planetary gear sub-set 44. As such, the outer gear member 48 always rotates at the same rate, and in the same direction, as the carrier 58. To effect this connection, the outer gear member 48 may be integrally formed on the carrier 58. The carrier 58 in the first planetary gear sub-set 42 is also selectively connected to the input shaft 22 through the engine-disconnect torque transfer device 26 to transfer power therebetween.

The outer gear member 46 in the first planetary gear sub-set 42 is directly connected to a first transfer gear 64. Here, too, the first transfer gear 64 may be integrally formed on the outer gear member 46. The first transfer gear 64 meshingly engages a second transfer gear 66 that is directly connected to the third, mode-selecting, torque transfer device 32. The third, mode-selecting, torque transfer device 32 selectively connects the second transfer gear 66 to a delivery member 68 that is directly connected to the intermediate output shaft 20. Accordingly, rotation of the outer gear member 46 in the first planetary gear sub-set 42 will cause the intermediate output shaft 20 to rotate when the third, mode-selecting torque transfer device 32 is engaged.

As described above, the first delivery shaft 62 connects the inner gear members 50 and 52 of the first and second planetary gear sub-sets 42 and 44. A third transfer gear 70 is also directly connected to the first delivery shaft 62. The third transfer gear 70 meshingly engages a drive gear 72 that is directly connected to the connecting shaft 74 which emanates from the second motor/generator 18. Thus, it can now be understood that the inner gear members 50 and 52 of the first and second planetary gear sub-sets 42 and 44 are continuously connected to the second motor/generator 18.

The first delivery shaft 62 is also directly connected to a fourth transfer gear 76 that meshingly engages a fifth transfer gear 78. The fifth transfer gear 78 is directly connected to a second delivery shaft 80 that is, in turn, directly connected to one side of the first, mode-selecting, torque transfer device 28. A hub gear 81 presented from the other side of the first, mode-selecting, torque transfer device 28 meshingly engages a delivery gear 82 that is directly connected to the intermediate output shaft 20. Accordingly, rotation of the first delivery shaft 62 causes the intermediate output shaft 20 to rotate when the first, mode-selecting, torque transfer device 28 is engaged.

The first motor/generator 16 is in continuous, geared connection with the carrier 60 of the second planetary gear sub-set 44. The carrier 60 is directly connected to a sixth transfer gear 84. For example, the sixth transfer gear 84 may be integrally formed with the carrier 60. The sixth transfer gear 84 meshingly engages a drive gear 86 that is secured to the connecting shaft 88 which emanates from the first motor/generator 16. As such, rotation of the carrier 60 causes the connecting shaft 88 of the first motor/generator 16 to rotate. Similarly, rotation of the connecting shaft 88 by the first motor/generator 16 causes the carrier 60 to rotate.

The sixth transfer gear 84, which, as previously explained, is connected to the carrier 60 of the second planetary gear sub-set 44, also meshingly engages a geared hub 90 on a sleeve shaft 92 that circumscribes the intermediate output shaft 20. The sleeve shaft 92 is also directly connected to the inner gear member 94 of an intermediate planetary gear set 96. The intermediate planetary gear set 96 further includes a plurality of planet gears 98 that meshingly engage both the inner gear member 94 and an outer gear member 100. The plurality of planet gears 98 are rotatably supported by a carrier 102. As is now apparent, rotation of the carrier 60 in the second planetary gear sub-set 44 causes the inner gear member 94 of the intermediate planetary gear set 96 to rotate. The sleeve shaft 92 is also selectively connected to the delivery member 68 by the fourth, mode-selecting, torque transfer device 34. By virtue of the aforesaid arrangement, the carrier 60 in the second planetary gear sub-set 44 and the inner gear member 94 of the intermediate planetary gear set 96 are selectively connected to both the carrier 102 of the intermediate planetary gear set 96 and the intermediate output shaft 20 by the fourth, mode-selecting, torque transfer device 34.

The outer gear member 100 of the intermediate planetary gear set 96 is selectively connected to ground 104 by the second, mode-selecting, torque transfer device 30. When the second, mode-selecting, torque transfer device 30 is engaged, the outer gear member 100 of the intermediate planetary gear set 96 serves as a reaction member for that planetary gear set 96.

The carrier 102 of the intermediate planetary gear set 96 is directly connected to the delivery member 68. As described above, the delivery member 68 is directly connected to the intermediate output shaft 20. Thus, rotation of the carrier 102 causes the intermediate output shaft 20 to rotate, and, conversely, rotation of the intermediate output shaft 20 causes the carrier 102 to rotate.

In summary, the structure of the hybrid transmission 10 delivers power from the engine 12, and/or the electric storage device 14, to the intermediate output shaft 20 through four modes, or gear trains. In each of the four modes the engine-disconnecting, torque transfer device 26 remains engaged in any situation where a mechanical connection of the engine 12 to the transmission 10 is necessary to the desired operation. The most common situation is that wherein the engine 12 is supplying all, or a portion, of the power to the transmission 10. Another example would be where the engine is receiving power from the transmission 10, as in an engine-braking situation.

To effect operation in the first mode, the first, mode-selecting, torque transfer device 28 is engaged, creating a connection between the first delivery shaft 62 and the intermediate output shaft 20. In this mode, the inner gear members 50 and 52 of the first and second planetary gear sub-sets 42 and 44 and the connecting shaft 74 of the second motor/generator 18 are selectively connected with the intermediate output shaft 20 through the first, mode-selecting, torque transfer device 28.

To effect operation of the second mode, the first, mode-selecting, torque transfer device 28 is disengaged, and the second, mode-selecting, torque transfer device 30 is engaged, grounding the outer gear member 100 of the intermediate planetary gear set 96. In this mode, the intermediate output shaft 20 is driven by the carrier 102 of the intermediate planetary gear set 96. Specifically, the carrier 102 is driven by the plurality of planet gears 98 that meshingly engage the inner gear member 94 that is driven by the carrier 60 of the second planetary gear sub-set 44.

To effect operation in the third mode, the second, mode-selecting, torque transfer device 30 is disengaged and the third, mode-selecting, torque transfer device 32 is engaged, creating a selective connection between the intermediate output shaft 20 and the outer gear member 46 of the first planetary gear sub-set 42.

To effect sequential operation in the fourth mode, the third, mode-selecting, torque transfer device 32 is disengaged and the fourth, mode-selecting, torque transfer device 34 is engaged, thereby simultaneously creating a selective connection between the intermediate output shaft 20 and both the inner gear member 94 and the carrier 102 of the intermediate planetary gear set 96.

An electric control unit (ECU) 106 controls the power flow between the first and second motor/generators 16 and 18, the electric storage device 14, and the steer unit 36. For example, the ECU 106 may communicate with the electric storage device 14 by transfer conductors 108A and 108B. The ECU 106 also communicates with the first motor/generator 16 by transfer conductors 108C and 108D, with the second motor/generator 18 by transfer conductors 108E and 108F and with the steer control unit 36 by transfer conductors 108G and 108H.

The ECU 106 also manipulates each motor/generator 16 and 18 to act as either a motor or a generator and selectively engages, or disengages, each torque transfer device 26, 28, 30, 32, and/or 34 in a well known manner. In addition, the ECU 106 receives and analyzes information from the transmission components and the vehicle operator and correspondingly manipulates the transmission components to comply with that information, as is exemplified by the hereinafter included description as to the operation of the hybrid transmission 10 in one typical situation—i.e.: when both the engine 12 and the electric storage device 14 are supplying power to operate the vehicle in which the transmission 10 is used.

When the hybrid transmission 10 is installed in a tracked vehicle, a well known steering mechanism is provided to regulate the speed of each track so the vehicle can turn or pivot. In the preferred embodiment of the present invention, a steer unit 36 is used to supply variable torque (both power and direction) to each track 110 and 112. The steer unit 36 is connected to a steer control shaft 114 by a simple, steer-selecting planetary gear set 116. The inner gear member 118 of the steer-selecting, planetary gear set 116 is secured to the connecting shaft 120 of the steer unit 36. The inner gear member 118 meshingly engages a plurality of planet gears 122 rotatably mounted on a carrier 124. Each planet gear 122 also meshingly engages an outer gear member 126 that is permanently connected to ground 104. The carrier 124 is directly connected to the steer control shaft 114.

The left and right output planetary gear sets 38 and 40, respectively, are operatively connected to the intermediate output shaft 20. Each output planetary gear set 38 and 40 comprises a respective outer gear member 128 and 130 that is directly connected to the intermediate output shaft 20. Each outer gear member 128 and 130 meshingly engages a respective plurality of planet gears 132 and 134 rotatably supported by corresponding carriers 136 and 138. Each carrier 136 and 138 is directly connected to an output shaft 140 and 142 which is, in turn, utilized to drive the respective left and right tracks 110 and 112. Each planet gear 132 and 134 also meshingly engages an inner gear member 144 and 146.

In order for the intermediate output shaft 20 to transfer driving power through the output planetary gear sets 38 and 40 in the arrangement previously described herein, it is necessary for the inner gear members 144 and 146 to serve as the reaction members in the output planetary gear sets 38 and 40. This function of the inner gear members 144 and 146 is achieved by effecting a driving connection between the inner gear members 144 and 146 and the steer unit 36—the driving connection passing through the steer-selecting planetary gear set 116. Because the steer unit 36 selected is the type that will not rotate unless it is effecting a steer function, and with the outer gear member 126 of the steer-selecting planetary gear set 116 being permanently grounded, the inner gear members 144 and 146 of the output planetary gear sets 38 and 40 rotate only to effect steering, or pivoting, of the vehicle. This arrangement accommodates the necessary power transfer between the intermediate output shaft 20 and the respective left and right output shafts 140 and 142 to drive the vehicle.

However, the aforesaid arrangement is instantly responsive to any input from the steer unit 36. Thus, whenever the steer unit 36 effects rotation of the connecting shaft 120 (in one direction to effect a left turn, or pivot, and in the other direction to effect a right turn, or pivot) the rotation is transmitted through the steer-selecting planetary gear set 116 to the inner gear members 144 and 146 of the steer output planetary gear sets 38 and 40, which rotate in whatever direction is required to effect a steer or pivot. The opposed directions in which the torque is applied to the inner gear members 144 and 146 results from the fact that an idler gear 154 is interposed between the steer control shaft 114 and only one of the output planetary gears sets 38 or 40.

The inner gear member 144 in the output planetary gear set 38 is directly connected to a steer transfer hub gear 148. As such, the steer transfer hub gear 148 may be integral with the inner gear member 144. The steer transfer hub gear 148 meshingly engages a steer drive gear 150 that may be mounted on the steer control shaft 114.

The inner gear member 146 in the other steer planetary gear set 40 is directly connected to a second steer transfer hub gear 152. Here, too, the second steer transfer hub gear 152 may be integral with the inner gear member 146. The second steer transfer hub gear 152 meshingly engages an idler gear 154 that also meshingly engages a second steer drive gear 156 that is also secured to the steer control shaft 114.

Hence, when the steer unit 36 provides rotation to the steer control shaft 114, equal, but opposite, rotation is supplied to the inner gear members 144 and 146 of the left and right output planetary gear sets 38 and 40. Turning, or pivoting, occurs when the rotation of the inner gear members 144 and 146 combines with the rotation of the intermediate output shaft 20. The combination creates different output rotational torque (both speed and direction) to the output shafts 140 and 144. The different output shaft torques cause the tracks to rotate at different speeds, and even in opposite directions, thus causing the vehicle to turn, or pivot.

OPERATION OF THE EXEMPLARY PREFERRED EMBODIMENT

Introduction

The operator of the vehicle has four primary devices to control the hybrid transmission 10. One of the primary control devices is a well known drive range selector (not shown) that directs the ECU 106 to configure the transmission for either the park, reverse, neutral, or forward drive range. The second and third primary control devices constitute an accelerator pedal (not shown) and a brake pedal (also not shown). In many installations these are the only control devices that feed information to the ECU 106. However, when a steer unit 36 is used to steer a track vehicle, a fourth primary control device—i.e.: a well known steering device such as a pair of levers (not shown)—is also employed to communicate with the ECU 106.

The information obtained by the ECU 106 from these four primary control sources will hereinafter be referred to as the "operator demand." The ECU 106 also obtains information from both the first and second motor generators 16 and 18, respectively, as well as the engine 12, and the electric storage device 26. In response to an operator's action, the ECU 106 determines what is required and then manipulates the components of the hybrid transmission 10 appropriately in response to the operator demand.

For example, in the exemplary embodiment shown in FIG. 1, when the operator selects a drive range and manipulates either the accelerator pedal or the brake pedal, the ECU 106 thereby determines if the vehicle should accelerate or decelerate. As described above, the transmission is capable of transmitting power from the power sources to the intermediate output shaft 20 through four modes, or gear trains. In each mode the transmission is capable of driving the output shaft through a gamut of output speeds. The possible output speeds increase as the transmission shifts from the first mode through the intermediate modes to the fourth mode. For the purpose of the following description of the operation of the preferred embodiment, the possible output speeds in each mode will be divided into three arbitrary categories—slow, medium and fast.

Thus, for example, a slow output speed in the second mode is generally faster than the fastest output speed in the first mode. However, some overlap is preferred so that identical output speeds can be achieved by successive modes, an arrangement that facilitates synchronous shifting between successive modes.

In any event, the ECU 106 constantly reads the operator demand in conjunction with the other information that expresses the operational state of the vehicle, including the power sources, and responds accordingly. The following descriptions describe various operational states of the hybrid transmission 10 as it drives a vehicle with both the engine and the electric storage source combining to serve as the source of the driving power.

I. Operation in the First Mode: Both the Engine and the Electric Storage Device Providing Driving Power In this situation, the ECU 106 has determined that the operator desires to accelerate and that power from both the engine 12 and the electric storage device 14 is available and may be used. Inasmuch as the engine 12 will be delivering power in this and the successive examples described, the engine-disconnect torque transfer device 26 will remain engaged. In the first mode the ECU 106 configures the transmission 10 by engaging the first, mode-selecting, torque transfer device 28. The ECU 106 assures that the remaining mode-selecting, torque transfer devices—i.e.: the second, mode-selecting, torque transfer device 30, the third, mode-selecting, torque transfer device 32 and the fourth, mode-selecting, torque transfer device 34—are disengaged.

In the first mode, the ECU 106 causes the first motor/generator 16 to act as a generator, drawing a portion of the input power that is supplied by the engine 12, and delivered through the compound planetary gear set 24, in order to effect operation as a generator. The remainder of the power supplied by the engine 12 also passes through the compound planetary gear set 24, but is split, and directed by the first, mode-selecting, torque transfer device 28, to drive the intermediate output shaft 20. However, the ECU 106 causes the second motor/generator 18 to act as a motor, powered by the electrical output of both the first motor/generator 16 and the electric storage device 14. The output power from the second motor/generator 18 combines with the power supplied by the engine 12 to drive the intermediate output shaft 20. Were the vehicle not a track vehicle, the intermediate output shaft 20 could provide the input to a differential (not shown) to drive appropriate left and right axles.

The aforesaid configuration provides the highest tractive effort and the slowest vehicular speed. It is, therefore, the most ideal configuration for starting the vehicle from a dead stop. For example, with an engine 12 capable of delivering five hundred (500) horsepower and an electric storage device 14 capable of delivering one hundred (100) horsepower, the hybrid transmission 10 can readily deliver three hundred (300) horsepower to each output shaft 140 and 142. Typical gear ratios in the hybrid transmission can supply a tractive effort on the order of fifty-thousand (50,000) pounds at up to about six (6) miles per hour with an engine 12 rated to deliver five hundred (500) horsepower at two thousand, five hundred (2,500) rotations per minute (RPM) operating in conjunction with an electric storage device 14 capable of delivering one hundred (100) horsepower.

II. Operation in the Second Mode: Both the Engine and the Electric Storage Device may Provide Driving Power When the ECU 106 determines that the vehicle conditions are appropriate to effect a further increase in output speed pursuant to the operator demand, the ECU 106 configures the transmission to provide slow output speed in the second range, or mode. Specifically, the ECU 106 configures the transmission 10 for the second mode by simultaneously disengaging the first, mode-selecting, torque transfer device 28 and engaging the second, mode-selecting, torque transfer device 30. The ECU 106 assures that the remaining mode-selecting, torque transfer devices—i.e.: the third, mode-selecting, torque transfer device 32 and the fourth, mode-selecting, torque transfer device 34—remain disengaged.

So configured for operation at slow output speed in the second range, the ECU 106 causes the second motor/generator 18 to act as a generator, drawing a portion of the power that is supplied by the engine 12, and delivered through the compound planetary gear set 24, in order to effect operation as a generator. The remainder of the power supplied by the engine 12 also passes through the compound planetary gear set 24, and—because the outer gear member 100 of the intermediate planetary gear set 96 is grounded—the carrier 102 thereof, which is connected to the delivery member 68, drives the intermediate output shaft 20.

Conversely, the ECU 106 causes the first motor/generator 16 to act as a motor, powered not only by the second motor/generator 18 acting as a generator but also the power supplied by the electric storage device 14.

When the operator demand reflects the need to proceed to the medium output speed in the second range, no change is required as to which torque transfer devices remain engaged and which remain disengaged. However, the ECU 106 causes both the first and second motor/generators 16 and 18 to act as motors, drawing the power supplied by the electric storage device 14. The power supplied by the motor/generators 16 and 18 thus combines with the power supplied by the engine 12 to drive the intermediate output shaft 20 through the intermediate planetary gear set 96 in the same manner described with respect to operation in the slow output speed portion of the second range, or mode.

When the operator demand reflects the need to proceed to the fast output speed portion of the second range, or mode, the ECU 106 causes the first motor/generator 16 to act as a generator, drawing a portion of the power that is supplied by the engine 12, and delivered through the compound planetary gear set 24, in order to effect operation as a generator. Here, too, the remainder of the power supplied by the engine 12 also passes through the compound planetary gear set 24, and—because the outer gear member 100 of the intermediate planetary gear set 96 is grounded—the carrier 102 thereof drives the intermediate output shaft 20 in the manner previously described for the slow and medium output speed portions of operation in the second mode.

However, the ECU 106 causes the second motor/generator 18 to act as a motor, powered by both the second motor/generator 18 and the electric storage device 14. The output power from the second motor/generator 18, operating as a motor, combines with the power supplied by the engine 12 to drive the intermediate output shaft 20.

III. Operation in the Third Mode: Both the Engine and the Electric Storage Device may Provide Driving Power When the ECU 106 determines that the vehicle conditions are appropriate to effect a further increase in output speed pursuant to the operator demand, the ECU 106 configures the transmission to provide slow output speed in the third range, or mode. Specifically, the ECU 106 configures the transmission 10 for the third mode by simultaneously disengaging the second, mode-selecting, torque transfer device 30 and engaging the third, mode-selecting, torque transfer device 32. The ECU 106 also assures that the remaining mode-selecting torque transfer devices—i.e.: the first, mode-selecting, torque transfer device 28 and the fourth, mode-selecting, torque transfer device 34—remain disengaged.

So configured for operation at slow output speed in the third range, or mode, the ECU 106 causes the second motor/generator 18 to act as a generator, drawing a portion of the input power that is supplied by the engine 12, and delivered through the compound planetary gear set 24, to effect operation as a generator. The remainder of the power supplied by the engine 12 is directed through the outer gear member 46 in the first planetary gear sub-set 42, and through the third, mode-selecting, torque transfer device 32, to drive the intermediate output shaft 20.

Conversely, the ECU 106 causes the first motor/generator 16 to act as a motor, powered by both the second motor/generator 18 acting as a generator and the power supplied by the electric storage device 14 to drive the intermediate output shaft 20.

When the operator demand reflects the need to proceed to the medium output speed portion in the third range, or mode, no change is required as to which mode-selecting, torque transfer devices remain engaged and which remain disengaged. However, the ECU 106 causes both motor/generators 16 and 18 to act as motors, drawing the power supplied by the electric storage device 14.

When the operator demand reflects the need to proceed to the fast output speed portion of the third range, or mode, the ECU 106 causes the first motor/generator 16 to act as a generator, drawing a portion of the power supplied by the engine 12, and delivered through the compound planetary gear set 24, to effect operation as a generator. However, the ECU 106 causes the second motor/generator 18 to act as a motor, powered by both the first motor/generator 16 and the electric storage device 14.

IV. Operation in the Fourth Mode: Both the Engine and the Electric Storage Device may Provide Driving Power When the ECU 106 determines that the vehicle conditions are appropriate to effect a further increase in output speed pursuant to the operator demand, the ECU 106 configures the transmission to provide slow output speed in the fourth range, or mode. Specifically, the ECU 106 configures the transmission 10 for the fourth mode by simultaneously disengaging the third, mode-selecting, torque transfer device 32 and engaging the fourth, mode-selecting, torque transfer device 34. The ECU 106 assures that the remaining torque transfer devices—i.e.: the first, mode-selecting, torque transfer device 28 and the second, mode-selecting, torque transfer device 30—are disengaged.

So configured for operation in the slow output speed portion of the fourth range, or mode, the ECU 106 causes the second motor/generator 18 to act as a generator, drawing a portion of the power that is supplied by the engine 12, and delivered through the compound planetary gear set 24, to effect operation as a generator. Conversely, the ECU 106 causes the first motor/generator 16 to act as a motor, powered by both the output power provided by the second motor/generator 18 and the power supplied by the electric storage device 14.

When the operator demand reflects the need to proceed to the medium output speed portion of the fourth range, or mode, no change is required as to which mode-selecting, torque transfer devices remain engaged and which remain disengaged. However, the ECU 106 causes both the first and second motor/generators 16 and 18 to act as motors, drawing the power supplied by the electric storage device 14. As such, the output power delivered by the motor/generators 16 and 18 adds to the output power supplied by the engine 12.

When the operator demand reflects the need to proceed to the fast output speed portion of the fourth range, or mode, the ECU 106 causes the first motor/generator 16 to act as a generator, drawing a portion of the power that is supplied by the engine 12, and delivered through the compound planetary gear set 24, to effect operation as a generator. However, the ECU 106 causes the second motor/generator 18 to act as a motor, powered by both the output power of the first motor/generator 16 and the power supplied by the electric storage device 14.

Conclusion

The foregoing description of the operation is directed solely to the situation wherein both the engine 12 and the electric storage device 14 provide power to drive the vehicle in which the hybrid transmission 10 is incorporated. Those skilled in this art will appreciate that the transmission can also operate when either the engine 12 or the electric storage device 14 are the sole source of driving power. It should also be understood that the engine 12 is capable of charging the electric storage device 14, even when it serves as the source of the driving power. It is also possible to utilize a transmission embodying the concepts of the present invention to harness the momentum of the vehicle to charge the electric storage device 14 or to have at least a portion of that energy absorbed by the engine 12.

When the specifications for a vehicle require the availability of high tractive effort with relatively high vehicle speed, the four-mode, input-split, hybrid transmission 10 embodying the concepts of the present invention is particularly suitable. It should be borne in mind that track vehicles, in particular, require high tractive effort inasmuch as all the vehicle weight reposes on the drive axles, or track, and tractive effort is related to total vehicle weight.

With the subject transmission 10, the input power is split in the first, second and fourth modes. In the first mode, the output speed is proportional to the speed of the second motor/generator 18. In the second and fourth mode, the output speed is proportionate to the speed of the first motor/generator 16. The third mode is a compound split in which the output speed is not in direct proportion to the speed of either the first or second motor/generator 16 or 18.

A transmission 10 embodying the concepts of the present invention can also deliver maximum vehicle speed with just electric power, even when the engine 12 is not running. It should also be noted that both the first and second modes can be simultaneously energized in order to provide maximum output torque, when required.

A transmission 10 embodying the concepts of the present invention also has the advantage of not requiring a third, separate, motor/generator for steer operation. The present transmission 10 permits electrical power to be drawn from either the first or second motor/generators 16 and 18 while steering. During a pivot steer both motor/generators 16 and 18 can act as generators to power the steer unit 36.

While only a preferred embodiment of my present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a four-mode, input split, parallel input, hybrid transmission embodying the concepts of the present invention is capable of accomplishing the objects of the invention.

I claim:

1. A hybrid transmission comprising:

an input means to receive power from an engine;

an intermediate power output means;

first and second motor/generators;

energy storage means for accepting power from, and supplying power to, said first and second motor/generators;

control means for regulating power flow between said energy storage means and said first and second motor/generators as well as between said first and second motor/generators;

a compounded planetary gear set having first and second planetary gear sub-sets;

each planetary gear sub-set having an inner gear member and an outer gear member each of which meshingly engage a plurality of planet gear members;

said plurality of planet gear members in said first and second planetary gear sub-sets being rotatably mounted on respective first and second carriers;

said input means being operatively connected to said first carrier;

said first motor/generator connected to said second carrier;

said second carrier also being selectively connected to said intermediate power output means;

said second motor/generator being continuously connected to said inner gear member of each said first and second planetary gear sub-sets;

said second motor/generator also being selectively connected to said intermediate power output means.

2. A hybrid transmission, as set forth in claim 1, wherein:

said first carrier is connected to the outer gear member of said second planetary gear sub-set to effect the compounding of said first and second planetary gear subsets.

3. A hybrid transmission, as set forth in claim 2, further comprising:

a plurality of mode-selecting, torque transfer devices selectively to effect a driving connection between at least said compound planetary gear set and said intermediate power output means.

4. A hybrid transmission, as set forth in claim 3, wherein:

one of said mode-selecting, torque transfer device selectively connects said second motor/generator to said intermediate power output means.

5. A hybrid transmission, as set forth in claim 4, further comprising:

an intermediate planetary gear set having an inner gear member, an outer gear member and a plurality of planet gear members meshingly engaging said inner and outer gear members;

said planet gear members in said intermediate planetary gear set rotatably supported on a carrier;

a mode-selecting, torque transfer device selectively grounding one gear member of said intermediate planetary gear set;

another gear member of said intermediate planetary gear set being permanently connected to said intermediate power output means; and, the final gear member of said intermediate planetary gear set being continuously connected to said compound planetary gear set.

6. A hybrid transmission, as set forth in claim 5, wherein:

said outer gear member of said intermediate planetary gear set is selectively connected to ground;

said carrier of said intermediate planetary gear set is permanently connected to said intermediate power output means;

said inner gear member of said intermediate planetary gear set is connected to said carrier of said second planetary gear sub-set.

7. A hybrid transmission, as set forth in claim 2, further comprising:

a first, mode-selecting, torque transfer device selectively connecting said second motor/generator to said intermediate power output means.

8. A hybrid transmission, as set forth in claim 7, further comprising:

an intermediate planetary gear set having an inner gear member, an outer gear member and a plurality of planet gear members meshingly engaging said inner and outer gear members;

said planet gear members in said intermediate planetary gear set rotatably supported on a carrier; and, a second, mode-selecting, torque transfer device selectively grounding said outer gear member in said intermediate planetary gear set.

9. A hybrid transmission, as set forth in claim 8, further comprising:

a third, mode-selecting, torque transfer device selectively connecting said outer gear member in said first planetary gear sub-set to said intermediate power output means; and, said carrier of said intermediate planetary gear set continuously connected to said intermediate power output means.

10. A hybrid transmission, as set forth in claim 9, further comprising:

a fourth, mode-selecting, torque transfer device selectively connecting said carrier in said intermediate planetary gear set to said inner gear member of said intermediate planetary gear set.

11. A hybrid transmission, as set forth in claim 10, further comprising:

left and right output planetary gear sets;

each said output planetary gear sets having an inner gear member and an outer gear member, said inner and outer gear members of each said planetary gear steering sets meshingly engage a plurality of planet gear members;

said planet gear members in said left and right output planetary gear sets being mounted on a respective left and right carrier;

said intermediate power output means fixedly secured to said first and second carriers;

a steer unit;

means connecting said steer unit to the inner gear member of each said output planetary gear sets to effect simultaneous rotation thereof in opposite directions;

a left and right output shaft;

said left and right output shafts connected to said outer gear member on said respective left and right output planetary gear sets.

12. A hybrid transmission, as set forth in claim 11, further comprising:

a steer-selecting planetary gear set interposed between said steer unit and said output planetary gear sets;

said steer-selecting planetary gear set having an inner gear member and an outer gear member, said inner and outer gear members of said steer-selecting planetary gear set meshingly engage a plurality of planet gear members;

said planet gear members in said steer-selecting planetary gear set being mounted on a carrier;

said inner gear member of said steer-selecting planetary gear set connected directly to said steer unit;

said outer gear member of said steer-selecting planetary gear set being grounded;

a steer control shaft;

said steer control shaft being directly connected to said carrier of said steer-selecting planetary gear set;

said steer control shaft being operatively connected to said inner gear member of each said left and right output planetary gear sets; and, an idler reversing gear interposed between said steer control shaft and one of said left or right output planetary gear sets.

* * * * *